(12) United States Patent
Liu

(10) Patent No.: US 11,754,772 B2
(45) Date of Patent: Sep. 12, 2023

(54) PRECISE EXTRUSION AND TRANSFER APPARATUS FOR LIGHT GUIDE PLATE PRODUCTION

(71) Applicant: NANJING BREADY ELECTRONICS CO., LTD., Nanjing (CN)

(72) Inventor: Yong Liu, Nanjing (CN)

(73) Assignee: NANJING BREADY ELECTRONICS CO., LTD., Nanjing (CN)

(*) Notice: Subject to any disclaimer, the term of this patent is extended or adjusted under 35 U.S.C. 154(b) by 534 days.

(21) Appl. No.: 16/965,775

(22) PCT Filed: Jun. 10, 2020

(86) PCT No.: PCT/CN2020/095422
§ 371 (c)(1),
(2) Date: Jul. 29, 2020

(87) PCT Pub. No.: WO2020/177784
PCT Pub. Date: Sep. 10, 2020

(65) Prior Publication Data
US 2021/0215870 A1  Jul. 15, 2021

(30) Foreign Application Priority Data
Jan. 6, 2020 (CN) .......................... 202010009106.3

(51) Int. Cl.
*B29C 48/25* (2019.01)
*B29C 48/07* (2019.01)
(Continued)

(52) U.S. Cl.
CPC ............ *G02B 6/0065* (2013.01); *B29C 33/42* (2013.01); *B29C 43/46* (2013.01); *B29C 48/07* (2019.02);
(Continued)

(58) Field of Classification Search
CPC ... B29C 48/07; B29C 48/143; B29C 48/2522; B29C 48/2567; B29C 48/287;
(Continued)

(56) References Cited

U.S. PATENT DOCUMENTS 4,278,482 A * 7/1981 Poteet ...................... B32B 3/12
156/289
4,357,293 A * 11/1982 Williamson, Jr. ...... B29C 33/14
264/275
(Continued)

FOREIGN PATENT DOCUMENTS

CN          106476243 A *  3/2017

OTHER PUBLICATIONS

English Translation of CN-106476243-A retrieved from espacenet (Year: 2023).*

*Primary Examiner* — Francisco W Tschen
*Assistant Examiner* — Elisa H Vera
(74) *Attorney, Agent, or Firm* — HAUPTMAN HAM, LLP

(57) ABSTRACT

The present invention discloses a precise extrusion and transfer apparatus for light guide plate production, including: a feed hopper; a dehumidifying and drying device; a screw conveyor fixedly mounted on one side of the outer wall of the dehumidifying and drying device; a screw extrusion device; and a molding box fixedly mounted with first motors and a second motor on one side of the outer wall by means of bolts, where power output ends of two sets of first motors pass through the molding box and are fixedly mounted with first precise roller bearings by means of rotating shafts, and a power output end of the second motor passes through the molding box and is fixedly mounted with a second precise roller bearing by means of a rotating shaft. According to the present invention, one-step molding from a particle base material to a finished light guide film is (Continued)

implemented, the problem of warpage is overcome, the production efficiency is improved, and the production cycle can be shortened to 1 s; and the product is thinner and can be as thin as 80 μm, the production costs such as material consumption and labor are greatly reduced, key indicators of the product such as brightness and light transmittance of the light guide film are comprehensively improved, and the advantages in quality and costs are enabled in fierce market competition.

10 Claims, 7 Drawing Sheets

(51) Int. Cl.
  *B29C 43/46*    (2006.01)
  *B29C 33/42*    (2006.01)
  *B29C 48/14*    (2019.01)
  *B29C 48/285*    (2019.01)
  *F21V 8/00*    (2006.01)

(52) U.S. Cl.
  CPC ........ *B29C 48/143* (2019.02); *B29C 48/2522* (2019.02); *B29C 48/2567* (2019.02); *B29C 48/287* (2019.02); *B29C 2948/9258* (2019.02); *B29C 2948/92342* (2019.02)

(58) Field of Classification Search
  CPC .. B29C 2948/92342; B29C 2948/9258; B29C 48/83; B29C 48/92; B29C 48/0023; B29C 2948/92704; B29C 48/002; B29C 48/08; B29C 48/28; B29C 48/30; B29C 48/503; B29C 48/505; B29C 48/68; B29C 48/832; B29C 48/885; G02B 6/0036; G02B 6/0058; B29B 13/06; B29B 7/826; B29B 7/16; B29D 11/00663; B29D 7/00; B29L 2011/0075
  See application file for complete search history.

(56) References Cited

U.S. PATENT DOCUMENTS

| | | | |
|---|---|---|---|
| 2002/0148549 A1* | 10/2002 | Bleckmann | B65H 45/09 156/73.3 |
| 2004/0264899 A1* | 12/2004 | Peterson, II | B29C 48/142 264/1.29 |
| 2006/0018026 A1* | 1/2006 | Bastawros | G02B 6/0065 359/619 |
| 2012/0051091 A1* | 3/2012 | Landry | B29D 11/00663 362/625 |
| 2019/0126519 A1* | 5/2019 | Hodsdon | B32B 27/12 |

* cited by examiner

PRECISE EXTRUSION AND TRANSFER APPARATUS FOR LIGHT GUIDE PLATE PRODUCTION

RELATED APPLICATIONS

The present application is a U.S. National Phase of International Application Number PCT/CN2020/095422, filed Jun. 10, 2020, and claims the priority of Chinese Application No. 202010009106.3, filed Jan. 6, 2020.

TECHNICAL FIELD

The present invention relates to the technical field of light guide plate production, and in particular, to a precise extrusion and transfer apparatus for light guide plate production.

BACKGROUND

A light guide plate is formed of an optical-grade acrylic/PC plate and a high-tech material with an extremely high refractive index and no light absorption, in which light guide points are printed on the bottom of the optical-grade acrylic plate using laser cutting, V-shaped cross grid cutting, and UV screen printing techniques. The optical-grade acrylic plate absorbs light emitted from a lamp so that the light stays on the surface of the optical-grade acrylic plate; when the light reaches the light guide points, light reflected will diffuse to different angles, and is then emitted from the front of the light guide plate by breaking a reflection condition; the light guide plate can emit light uniformly through the various density- and dimension-variable light guide points. The purpose of a reflective sheet is to reflect light exposed from the bottom back to the light guide plate, so as to improve light use efficiency; in terms of light-emitting brightness of an equivalent area, the light emitting efficiency is high and the power consumption is low. A single-sided microstructure array light guide plate generally uses an extrusion molding manufacturing process.

However, the residual stress generated in an existing injection molding process is the main cause of a molded product defect. On the one hand, a flow stress is caused by flow during filling and a thermal residual stress is caused by temperature unevenness or the like during cooling; on the other hand, the shrinkage of plastic per se will influence dimensional accuracy of a finished product, and a holding pressure and a shrinkage stress make the residual stress unevenly distributed, thereby causing deformation of the molded product.

SUMMARY

The purpose of the present invention is to provide a precise extrusion and transfer apparatus for light guide plate production, so as to solve the foregoing problem raised in the background.

In order to achieve the foregoing purpose, the present invention provides a technical solution as follows: a precise extrusion and transfer apparatus for light guide plate production, including:

a feed hopper;
a dehumidifying and drying device;
a screw conveyor fixedly mounted on one side of the outer wall of the dehumidifying and drying device;
a screw extrusion device;
a molding box fixedly mounted with first motors and a second motor on one side of the outer wall by means of bolts, where power output ends of two sets of first motors pass through the molding box and are fixedly mounted with first precise roller bearings by means of rotating shafts, a power output end of the second motor passes through the molding box and is fixedly mounted with a second precise roller bearing by means of a rotating shaft, the second precise roller bearing is located between two sets of first precise roller bearings, a winding roller is fixedly mounted on one end of the interior of the molding box by means of a rotating shaft, a soft film is wrapped around the outside of the winding roller, rolling wheels are rotatably mounted at the lower end of the second precise roller bearing inside the molding box, and two sets of rolling wheels are provided; and a control switch;

where the feed hopper is fixedly mounted on one side of the top end of the dehumidifying and drying device, the screw extrusion device is fixedly mounted at the top end of the molding box, and the control switch is electrically coupled to the first motors and the second motor, respectively.

Preferably, the apparatus further includes:
a material outlet arranged at one end of the outer wall of the molding box.

Preferably, the dehumidifying and drying device includes a drying cylinder, four corners of the bottom end of the drying cylinder are fixedly mounted with legs, a fourth motor is fixedly mounted at a position at the top end of the drying cylinder close to the axis by means of bolts, a power output end of the fourth motor passes through the drying cylinder and is fixedly connected to an agitator, filter screens are fixedly mounted at the outer side of the agitator inside the drying cylinder, air ejecting pipes are fixedly mounted on the surface of the inner wall of the drying cylinder and three air ejecting pipes are provided, nozzles are fixedly mounted on the surfaces of the inner walls of the three air ejecting pipes and six sets of nozzles are provided, a hot air blower is fixedly mounted on one side of the outer wall of the drying cylinder by means of a support, an outlet end of the hot air blower is fixedly connected to an inlet main pipe, and the inlet main pipe is fixedly mounted on the surface of one side of the outer wall of the drying cylinder; and the fourth motor and the hot air blower are electrically coupled to the control switch, respectively.

Preferably, the apparatus further includes:
a temperature sensor fixedly mounted on one side of the inner wall of the drying cylinder;
where the temperature sensor is electrically coupled to the control switch.

Preferably, the screw extrusion device includes an extrusion cylinder and a third motor, the third motor is fixedly mounted on one side of the extrusion cylinder by means of a motor support, a power output end of the third motor passes through the extrusion cylinder and is fixedly connected to a screw, a heater is fixedly mounted between the inner wall and the outer wall of the extrusion cylinder, a hopper is fixedly mounted on one side of the upper end of the extrusion cylinder, and the bottom end of the hopper extends to the interior of the extrusion cylinder; and the third motor and the heater are electrically coupled to the control switch, respectively.

Preferably, the apparatus further includes:
an extrusion nozzle fixedly mounted on one side of the bottom end of the extrusion cylinder;

where the bottom end of the extrusion nozzle passes through the molding box and is located between one set of first precise roller bearing and the second precise roller bearing.

Preferably, dot grooves are arranged on the surfaces of the outer walls of the first precise roller bearing and the second precise roller bearing, and a plurality of dot grooves is provided.

Preferably, the inlet main pipe is communicated with the three air ejecting pipes by means of connecting pipes.

Preferably, the dehumidifying and drying device further includes a discharge pipe, an inlet end of the screw conveyor is communicated with the discharge pipe, and an outlet end of the screw conveyor is communicated with the hopper.

Preferably, the apparatus further includes:

a rotating speed regulator electrically coupled to the first motors and the second motor, respectively.

Compared with the prior art, the beneficial effects of the present invention are as follows:

1. According to the present invention, an ultra-thin double-sided dot light guide film can be prepared, in which one-step molding from a particle base material to the finished light guide film is implemented, the problem of warpage is overcome, the production efficiency is improved, and the production cycle can be shortened to 1 s; and the product is thinner and can be as thin as 80 μm, the production costs such as material consumption and labor are greatly reduced, key indicators of the product such as brightness and light transmittance of the light guide film are comprehensively improved, the advantages in quality and cost are enabled in fierce market competition, differential recognition are brought to downstream customers, and the progress in "generation" of the LCD industry is promoted.

Figure 1:
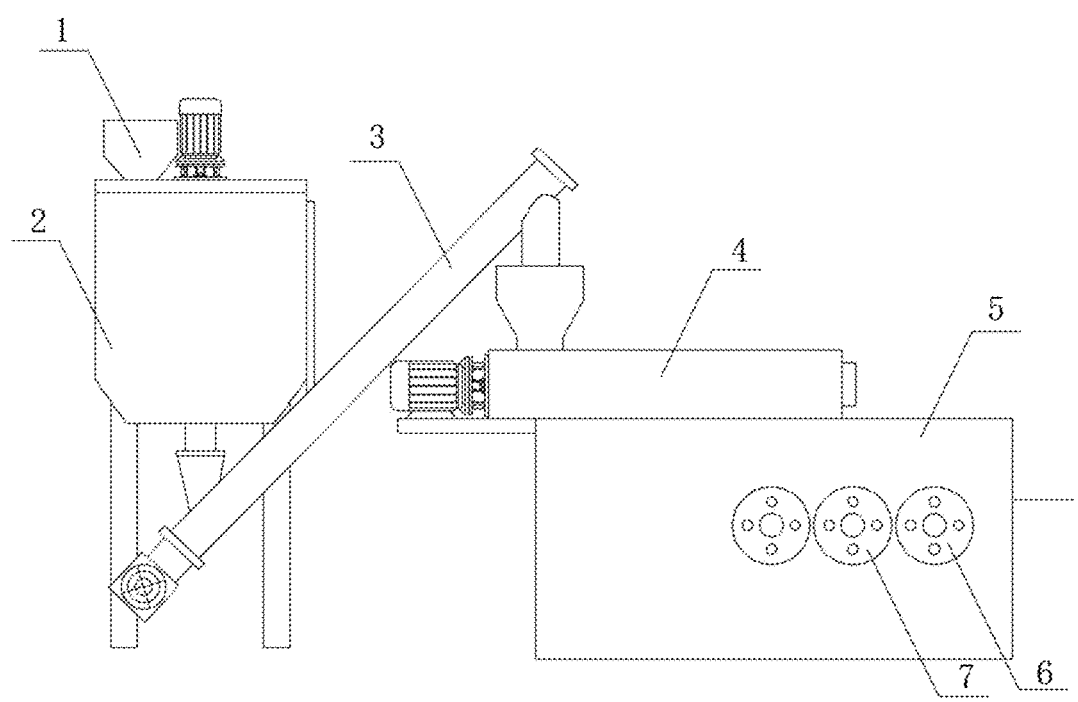
FIG. 1 is a schematic structural diagram of the entire apparatus of the present invention.

In the drawings: 1—feed hopper; 2—dehumidifying and drying device; 3—screw conveyor; 4—screw extrusion device; 5—molding box; 6—first motor; 7—second motor; 8—winding roller; 9—soft film; 10—first precise roller bearing; 11—second precise roller bearing; 12—dot groove; 13—dicharge port; 14—rolling wheel; 15—extrusion nozzle; 16—third motor; 17—extrusion cylinder; 18—hopper; 19—heater; 20—screw; 21—drying cylinder; 22—air ejecting pipe; 23—filter screen; 24—fourth motor; 25—agitator; 26—temperature sensor; 27—connecting pipe; 28—inlet main pipe; 29—hot air blower; 30—discharge pipe; 31—nozzle.

DETAILED DESCRIPTION

The technical solution in embodiments of the present invention is clearly and fully described below with reference to the accompanying drawings in the embodiments of the present invention. Apparently, the described embodiments are merely some of the embodiments of the present invention, but not all the embodiments. Based on the embodiments of the present invention, all other embodiments obtained by a person of ordinary skill in the art without involving an inventive effort shall fall within the scope of protection of the present invention.

Embodiment 1

Figure 2:
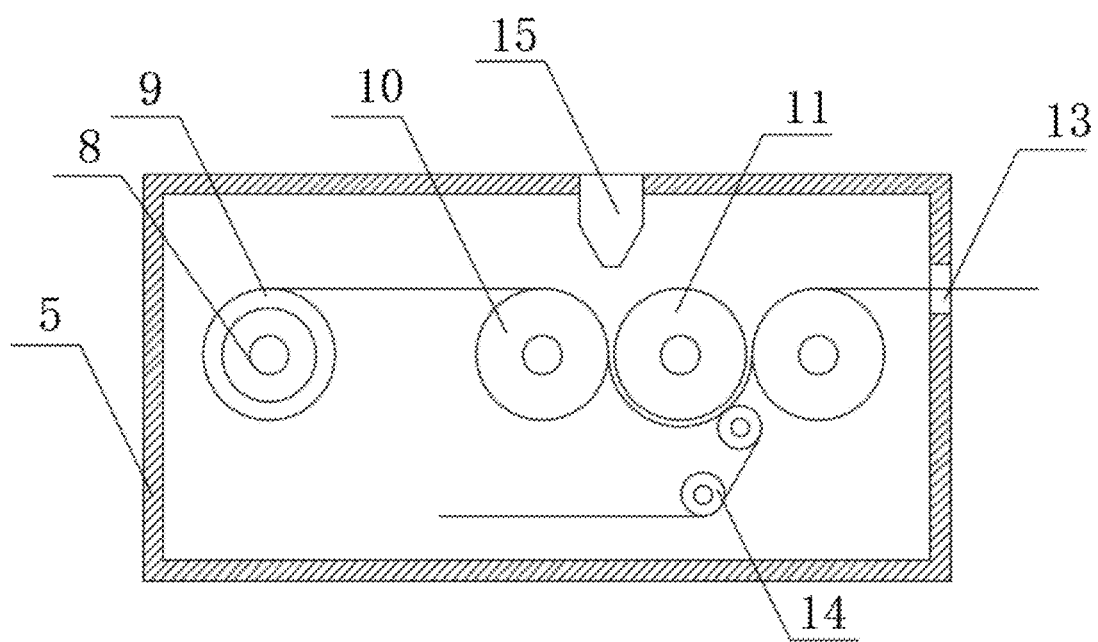
FIG. 2 is a schematic structural diagram of the interior of a molding box of the present invention.
Figure 3:
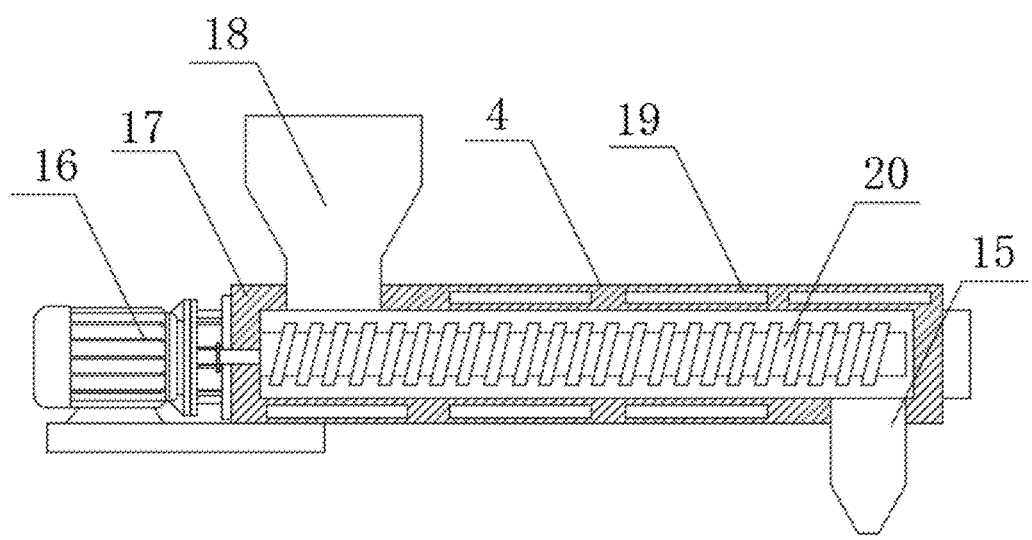
FIG. 3 is a schematic structural diagram of a screw extrusion device of the present invention.
Figure 4:
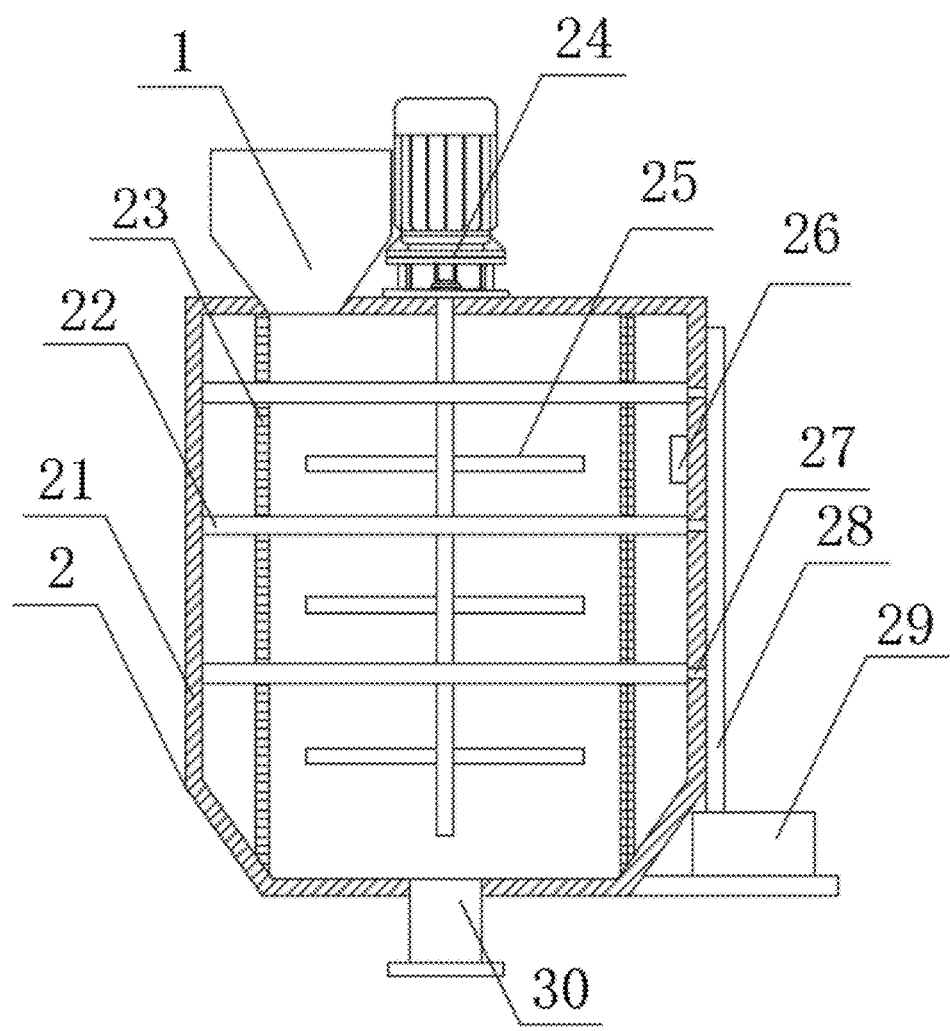
FIG. 4 is a schematic structural diagram of a dehumidifying and drying device of the present invention.
Figure 5:
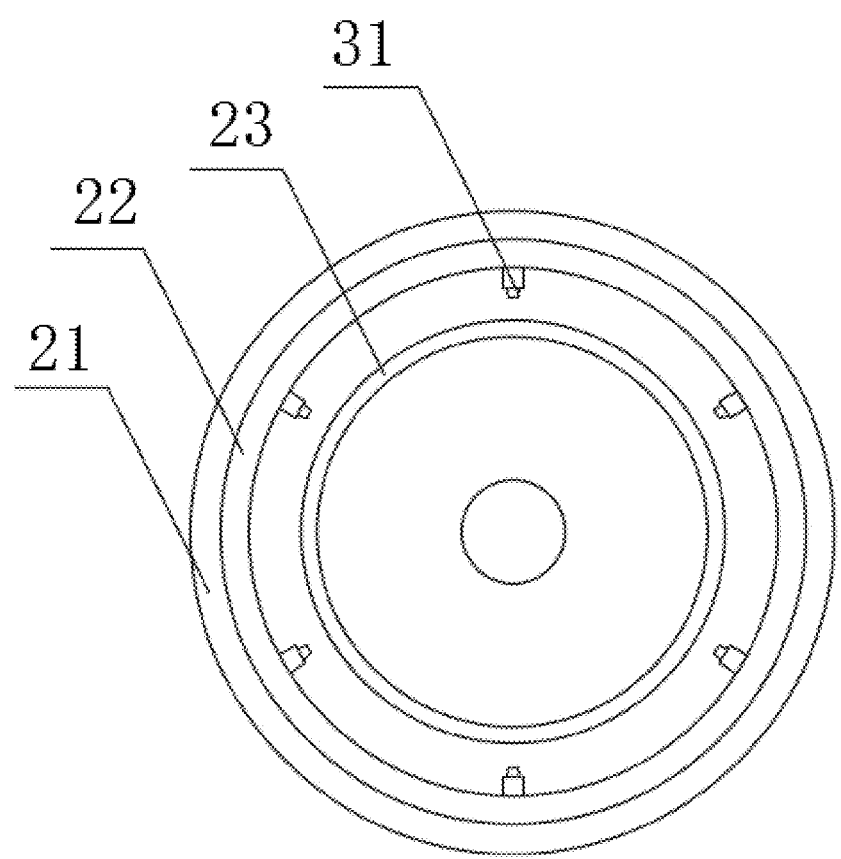
FIG. 5 is an overhead view of the interior of a drying cylinder of the present invention.
Figure 6:
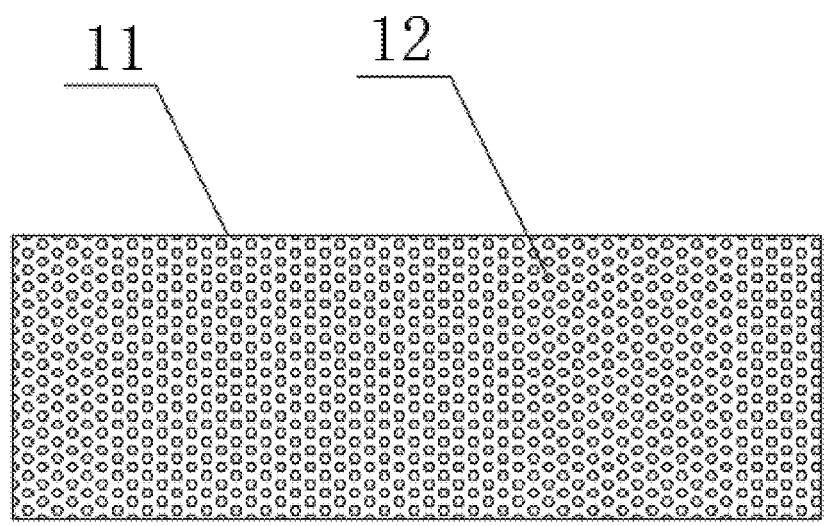
FIG. 6 is a schematic structural diagram of a second precise roller bearing of the present invention.
Figure 7:
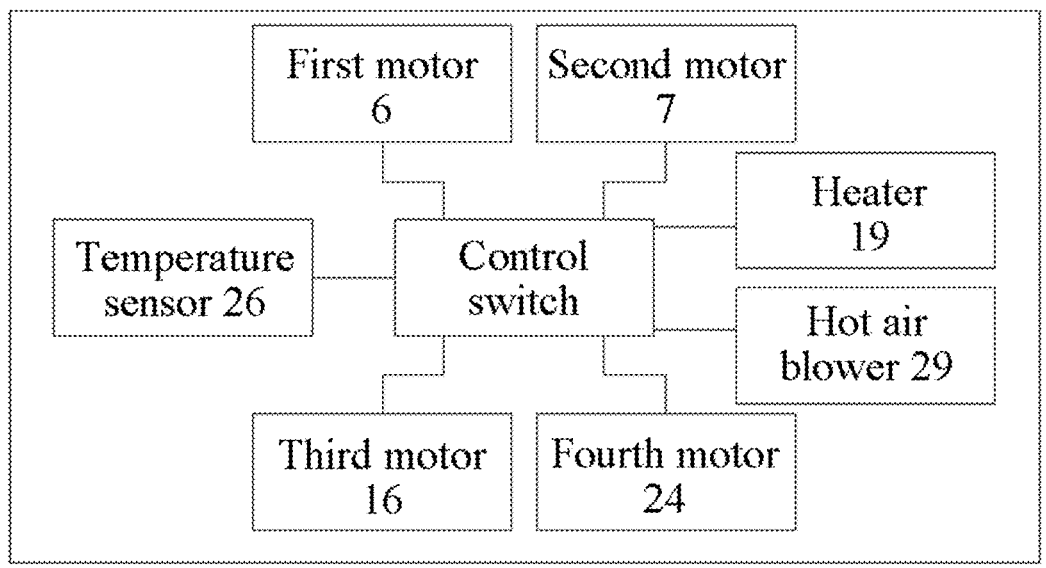
FIG. 7 is a schematic structural block diagram of components of the present invention.

Referring to FIGS. 1-7, the present invention provides a technical solution as follows: a precise extrusion and transfer apparatus for light guide plate production, including: a feed hopper 1; a dehumidifying and drying device 2; a screw conveyor 3; a screw extrusion device 4; a molding box 5; and a control switch.

The feed hopper 1 is made of a metal material or an alloy material such as iron, copper, steel, and stainless steel.

The feed hopper 1 is fixedly mounted on one side of the top end of the dehumidifying and drying device 2.

The screw conveyor 3 is fixedly mounted on one side of the outer wall of the dehumidifying and drying device 2.

An inlet end of the screw conveyor 3 is communicated with a discharge pipe 30 of the dehumidifying and drying device 2, and an outlet end of the screw conveyor 3 is communicated with a hopper 18 of the screw extrusion device 4.

Further, a driving mechanism of the screw conveyor 3 is a motor; when the motor drives a screw shaft to rotate, due to the gravity of a material and friction generated between the material and a groove wall, the material can move forward along a groove bottom of the conveyor only under the push of blades. Generally, a driving device and a material outlet are placed at the same end of the conveyer, and a feed port is placed near the tail of the other end as close as possible, so that a raw material in a drying cylinder 21 can be conveyed into an extrusion cylinder 17.

One side of the outer wall of the molding box 5 is fixedly mounted with first motors 6 and a second motor 7 by means of bolts, where power output ends of two sets of first motors 6 pass through the molding box 5 and are fixedly mounted with first precise roller bearings 10 by means of rotating shafts, a power output end of the second motor 7 passes through the molding box 5 and is fixedly mounted with a second precise roller bearing 11 by means of a rotating shaft, the second precise roller bearing 11 is located between two sets of first precise roller bearings 10, a winding roller 8 is fixedly mounted on one end of the interior of the molding box 5 by means of a rotating shaft, a soft film 9 is wrapped around the outside of the winding roller 8, rolling wheels 14 are rotatably mounted at the lower end of the second precise roller bearing 11 inside the molding box 5, and two sets of rolling wheels 14 are provided.

The molding box 5 is made of a metal material or an alloy material such as iron, copper, steel, and stainless steel.

Further, the overall shape of the molding box 5 is a rectangular structure.

The first motor 6 and the second motor 7 are ones of an AC asynchronous motor, a brushless DC motor, or a permanent magnet synchronous motor; and the operation of the first motor 6 and the second motor 7 can drive, by means of the rotating shafts, the first previse roller bearing 10 and the second precise roller bearing 11 to rotate, where the first precise roller bearing 10 rotates clockwise, while the second precise roller bearing 11 rotates counterclockwise.

The arc-shaped side surfaces of the first precise roller bearing 10 and the second precise roller bearing 11 are provided with 1 to 10 sample grooves according to the dimension of a target product, so as to achieve continuous and independent production of the target product.

Further, the winding roller 8, the first precise roller bearing 10, and the second precise roller bearing 11 are located on the same horizontal line.

The soft film 9 provides support for the second precise roller bearing 11, so as to assist in product molding and improve a dot transfer rate.

The screw extrusion device 4 is fixedly mounted at the top end of the molding box 5, and the control switch is electrically coupled to the first motors 6 and the second motor 7, respectively.

The apparatus further includes:

a material outlet 13 arranged at one end of the outer wall of the molding box 5.

The screw extrusion device 4 includes an extrusion cylinder 17 and a third motor 16, the third motor 16 is fixedly mounted on one side of the extrusion cylinder 17 by means of a motor support, a power output end of the third motor 16 passes through the extrusion cylinder 17 and is fixedly connected to a screw 20, a heater 19 is fixedly mounted between the inner wall and the outer wall of the extrusion cylinder 17, a hopper 18 is fixedly mounted on one side of the upper end of the extrusion cylinder 17, and the bottom end of the hopper 18 extends to the interior of the extrusion cylinder 17; and the third motor 16 and the heater 19 are electrically coupled to the control switch, respectively.

The apparatus further includes:

an extrusion nozzle 15 fixedly mounted on one side of the bottom end of the extrusion cylinder 17.

The bottom end of the extrusion nozzle 15 passes through the molding box 5 and is located between one set of first precise roller bearing 10 and the second precise roller bearing 11.

The extrusion nozzle 15 can inject a melted material into dot grooves 12 of the second precise roller bearing 11.

The dot grooves 12 are arranged on the surfaces of the outer walls of the first precise roller bearing 10 and the second precise roller bearing 11, and a plurality of dot grooves 12 is provided.

The apparatus further includes:

a rotating speed regulator electrically coupled to the first motors 6 and the second motor 7, respectively.

Further, the rotating speed regulator is configured to regulate rotating speeds of the first motors 6 and the second motor 7.

In view of the foregoing embodiment, firstly, the raw material (such as PC) is poured and gathered into the feed hopper 1; then drying and dehumidifying are performed in the dehumidifying and drying device 2, where the temperature is controlled at about 90-100° C.; after drying is completed, the material is conveyed into the hopper 18 by means of the screw conveyer 3; the material falls down from the hopper 18 and enters the extrusion cylinder 17; the third motor 16 operates to drive the screw 20 to rotate, the material is melted in cooperation with heating of the heater 19, and the temperature is controlled so that the fluidity of the base material allows paving of the base material into all dot grooves 12 of the second precise roller beating 11 within a predetermined time period; the melted material enters the next process, in which extrusion and transfer are performed under the co-action of the first precise roller bearing 10, the second precise roller bearing 11, and the soft film, so as to manufacture a rolled product, where a target light guide film can be as thin as 80 μm, continuous production is performed to obtain the light guide film having the width of 350 mm, and the production line speed is 2-5 m/min; and then the rolled product is cut as a desired finished product of a customer by means of cutting of a post-process, and the finished product can be shipped after passing some measurements for ensuring that the quality meets the customer's requirements.

Embodiment 2

Referring to FIGS. 1, 4, 5, and 7, the present invention provides a technical solution as follows: a precise extrusion and transfer apparatus for light guide plate production, where the dehumidifying and drying device 2 includes a drying cylinder 21, four corners of the bottom end of the drying cylinder 21 are fixedly mounted with legs, a fourth motor 24 is fixedly mounted at a position at the top end of the drying cylinder 21 close to the axis by means of bolts, a power output end of the fourth motor 24 passes through the drying cylinder 21 and is fixedly connected to an agitator 25, filter screens 23 are fixedly mounted at the outer side of the agitator 25 inside the drying cylinder 21, air ejecting pipes 22 are fixedly mounted on the surface of the inner wall of the drying cylinder 21 and three air ejecting pipes 22 are provided, nozzles 31 are fixedly mounted on the surfaces of the inner walls of the three air ejecting pipes 22 and six sets of nozzles 31 are provided, a hot air blower 29 is fixedly mounted on one side of the outer wall of the drying cylinder 21 by means of a support, an outlet end of the hot air blower 29 is fixedly connected to an inlet main pipe 28, and the inlet main pipe 28 is fixedly mounted on the surface of one side of the outer wall of the drying cylinder 21.

The drying cylinder 21 is made of a metal material or an alloy material such as iron, copper, steel, and stainless steel.

The fourth motor 24 is one of an AC asynchronous motor, a brushless DC motor, or a permanent magnet synchronous motor, and the operation of the fourth motor 24 can drive the agitator 25 to rotate.

The agitator 25 is made of a metal material or an alloy material such as iron, copper, steel, and stainless steel.

Further, the agitator 25 can agitate a raw material to ensure uniform heating of the raw material, thereby improving the drying efficiency.

Further, the bottom end of the feed hopper 1 extends into the drying cylinder 21 and is located at the inner sides of the filter screens 23, so as to ensure that the raw material can enter into the filter screens 23 in the drying cylinder 21 from the feed hopper 1.

The air ejecting pipe 22 has a ring-shaped structure, and is arranged around the inner wall of the drying cylinder 21 as a ring.

Further, three air ejecting pipes 22 are provided to increase the ejection area of hot air, thereby improving the drying efficiency.

The filter screen 23 can isolate the raw material, so that the raw material will not influence ejection of hot air in the nozzle 31.

The fourth motor 24 and the hot air blower 29 are electrically coupled to the control switch, respectively.

The apparatus further includes:

a temperature sensor 26 fixedly mounted on one side of the inner wall of the drying cylinder 21.

The model number of the temperature sensor 26 is pt100.

Further, the temperature sensor 26 is configured to measure a real-time temperature in the drying cylinder 21, and control the temperature at about 90-100° C.

The temperature sensor 26 is electrically coupled to the control switch.

The inlet main pipe 28 is communicated with the three air ejecting pipes 22 by means of connecting pipes 27.

In view of the foregoing embodiment, the raw material is gathered in the drying cylinder 21 from the feed hopper 1; then the fourth motor 24 and the hot air blower 29 are turned on, so that hot air can be injected into the inlet main pipe 28 by the hot air blower 29, then respectively enters the three air ejecting pipes 22 via three connecting pipes 27, and is finally ejected from the nozzles 31; the ejected hot air passes through the filter screens 23 to be sprayed to the raw material; in cooperation with agitation of the raw material by the agitator 25, it is ensured that the raw material can fully contact the hot air, thereby improving the drying effect of the raw material.

In the implementations provided in the present invention, it should be understood that the disclosed apparatus may be implemented in other ways, and the indicated or discussed mutual welding or threaded connection or winding connection may be assisted by devices, for example, a welding torch is used for welding, and a wrench is used for threaded connection. The components of the apparatus are made of various materials, such as aluminum alloy, steel, copper and other metal materials, and are molded by casting, mechanical stamping or the like.

It should be noted that in this document, relational terms such as "first" and "second" are used only for distinguishing one entity or operation from another entity or operation, and do not necessarily require or imply that these entities or operations have any such actual relationships or orders. Moreover, the terms "include", "comprise" or any other variants thereof are intended to cover non-exclusive inclusion, so that a process, method, article or device that includes a series of elements includes not only those elements, but also other elements that are not explicitly listed or elements inherent to the process, method, article, or device.

The above are merely implementations of the present invention, and are not intended to limit the patent scope of the present invention. Any equivalent structure or equivalent process transformation made on the basis of the description and drawings of the present invention, or direct or indirect application in other related technical fields is equally included within the scope of patent protection of the present invention.

The invention claimed is:

1. An extrusion and transfer apparatus for light guide plate production, comprising:
   a feed hopper;
   a dehumidifying and drying device;
   a screw conveyor fixedly mounted on one side of the outer wall of the dehumidifying and drying device;
   a screw extrusion device;
   a molding box fixedly mounted with first motors and a second motor on one side of the outer wall by means of bolts, wherein power output ends of two sets of first motors pass through the molding box and are fixedly mounted with first roller bearings by means of rotating shafts, a power output end of the second motor passes through the molding box and is fixedly mounted with a second roller bearing by means of a rotating shaft, the second roller bearing is located between two sets of first bearings, a winding roller is fixedly mounted on one end of the interior of the molding box by means of a rotating shaft, a film is wrapped around the outside of the winding roller, rolling wheels are rotatably mounted at the lower end of the second roller bearing inside the molding box, and two sets of rolling wheels are provided; and
   a control switch,
   wherein the feed hopper is fixedly mounted on one side of the top end of the dehumidifying and drying device, the screw extrusion device is fixedly mounted at the top end of the molding box, and the control switch is electrically coupled to the first motors and the second motor, respectively,
   the dehumidifying and drying device comprising a drying cylinder, the drying cylinder having a bottom end and an inner wall, the bottom end having a plurality of equidistant points to which a plurality of legs are fixedly mounted, and the inner wall having a surface to which a plurality of ejecting pipes are fixedly mounted, and
   the screw conveyor mounted on an outer wall of the drying cylinder, and the screw conveyor connects at an upward angle from the outer wall to the screw extrusion device, and the screw conveyor comprising a motor to counter gravity due to the upward angle from the outer wall to the screw extrusion device, and the screw conveyor comprising a motor to counter gravity due to the upward angle.

2. The extrusion and transfer apparatus for light guide plate production according to claim 1, further comprising:
   a material outlet arranged at one end of the outer wall of the molding box.

3. The extrusion and transfer apparatus for light guide plate production according to claim 1, wherein a fourth motor is fixedly mounted at a position at a top end of the drying cylinder close to the axis by means of bolts, a power output end of the fourth motor passes through the drying cylinder and is fixedly connected to an agitator, filter screens are fixedly mounted at the outer side of the agitator inside the drying cylinder, nozzles are fixedly mounted on the surfaces of the inner walls of the three air ejecting pipes and six sets of nozzles are provided, a hot air blower is fixedly mounted on one side of the outer wall of the drying cylinder by means of a support, an outlet end of the hot air blower is fixedly connected to an inlet main pipe, and the inlet main pipe is fixedly mounted on the surface of one side of the outer wall of the drying cylinder, and wherein the fourth motor and the hot air blower are electrically coupled to the control switch, respectively.

4. The extrusion and transfer apparatus for light guide plate production according to claim 3, further comprising:
   a temperature sensor fixedly mounted on one side of the inner wall of the drying cylinder, wherein the temperature sensor is electrically coupled to the control switch.

5. The extrusion and transfer apparatus for light guide plate production according to claim 3, wherein the inlet main pipe is communicated with the three air ejecting pipes by means of connecting pipes.

6. The extrusion and transfer apparatus for light guide plate production according to claim 1, wherein the screw extrusion device comprises an extrusion cylinder and a third motor, the third motor is fixedly mounted on one side of the extrusion cylinder by means of a motor support, a power output end of the third motor passes through the extrusion cylinder and is fixedly connected to a screw, a heater is fixedly mounted between the inner wall and the outer wall of the extrusion cylinder, a hopper is fixedly mounted on one side of the upper end of the extrusion cylinder, and the bottom end of the hopper extends to the interior of the extrusion cylinder, and wherein the third motor and the heater are electrically coupled to the control switch, respectively.

7. The extrusion and transfer apparatus for light guide plate production according to claim 5, further comprising:
   an extrusion nozzle fixedly mounted on one side of the bottom end of the extrusion cylinder;
   wherein the bottom end of the extrusion nozzle passes through the molding box and is located between one set of first roller bearing and the second roller bearing.

8. The extrusion and transfer apparatus for light guide plate production according to claim 6, wherein the dehumidifying and drying device further comprises a discharge pipe, an inlet end of the screw conveyor is communicated with the discharge pipe, and an outlet end of the screw conveyor is communicated with the hopper.

9. The extrusion and transfer apparatus for light guide plate production according to claim 1, wherein dot grooves are arranged on the surfaces of the outer walls of the first roller bearing and the second roller bearing.

10. The extrusion and transfer apparatus for light guide plate production according to claim 1, further comprising:
    a rotating speed regulator electrically coupled to the first motors and the second motor, respectively.

* * * * *